United States Patent

Awane et al.

[11] Patent Number: 5,982,469
[45] Date of Patent: Nov. 9, 1999

[54] METHOD OF MANUFACTURING A LIQUID CRYSTAL DEVICE INCLUDING A PERIPHERAL CIRCUIT AREA AND A PIXEL AREA ON THE SAME SUBSTRATE

[75] Inventors: Katunobu Awane, Nara; Shunpei Yamazaki, Tokyo, both of Japan

[73] Assignees: Semiconductor Energy Laboratory Co., Ltd., Kangawa-ken; Sharp Kabushiki Kaisha, Osaka, both of Japan

[21] Appl. No.: 08/604,548

[22] Filed: Feb. 21, 1996

[30] Foreign Application Priority Data

Feb. 21, 1995 [JP] Japan ................................. 7-056482

[51] Int. Cl.[6] ................................................ G02F 1/1345
[52] U.S. Cl. ............................................ 349/151; 349/158
[58] Field of Search ..................................... 349/151, 187, 349/158, 73; 345/92, 98

[56] References Cited

U.S. PATENT DOCUMENTS

| | | | |
|---|---|---|---|
| 4,906,071 | 3/1990 | Takahara et al. | 349/151 |
| 5,200,847 | 4/1993 | Mawatari et al. | 349/151 |
| 5,453,858 | 9/1995 | Yamazaki | 349/151 |

Primary Examiner—James A. Dudek
Attorney, Agent, or Firm—Fish & Richardson P.C.

[57] ABSTRACT

In forming four liquid crystal panels on a glass substrate, layout is so made that peripheral driving circuit areas of the respective panels are opposed to each other. With this layout, the peripheral driving circuit areas, which are prone to be affected by particles, are prevented from existing in regions close to the perimeter of the glass substrate. This allows liquid crystal panels to be produced at a high yield, as well as enables efficient use of the glass substrate.

6 Claims, 7 Drawing Sheets

METHOD OF MANUFACTURING A LIQUID
CRYSTAL DEVICE INCLUDING A
PERIPHERAL CIRCUIT AREA AND A PIXEL
AREA ON THE SAME SUBSTRATE

BACKGROUND OF THE INVENTION

1. Field of the Invention

The present invention relates to a manufacturing method of a display device having a pixel area and a peripheral driving circuit area and, more specifically, to a manufacturing method of an active matrix type liquid crystal display device.

2. Description of the Related Art

An active matrix liquid crystal display device is conventionally known. In the active matrix liquid crystal display device, a structure is known in which a pixel area having pixels that are arranged in a matrix form and a peripheral driving circuit for driving thin-film transistors that are arranged in the pixel area are integrated on the same substrate.

FIG. 1 shows a general configuration of a panel of an active matrix liquid crystal display device in which a pixel area and a peripheral driving circuit area are integrated on a glass substrate 101. Reference numeral 102 denotes a pixel area in which pixels are arranged in a matrix of several hundred by several hundred. The fundamental configuration of the pixel area 102 is such that source lines 104 and gate lines 105 are arranged in a matrix form, thin-film transistors 106 are arranged at each intersection of the source and gate lines, and the drains of the thin-film transistors 106 are connected to electrodes (pixel electrodes) for applying an electric field to a liquid crystal 107.

Reference numeral 103 denotes a peripheral driving circuit area for driving the thin-film transistors for the respective pixels. The peripheral driving circuit area 103 is also constituted of thin-film transistors. The standardized configuration of the peripheral driving circuit includes a shift register circuit and an analog buffer circuit that allows a low-impedance current flow.

In general, plural panels of the active matrix liquid display device shown in FIG. 1 are produced at the same time by forming a plurality of FIG. 1 configurations on a large glass substrate and then cutting the glass substrate, because this method can reduce the manufacturing cost from the case of producing the panel of FIG. 1 one by one.

FIG. 2 shows a general layout of active matrix liquid crystal display panels. That is, in FIG. 2, a single glass substrate 101 is allocated to four active matrix liquid crystal display panels 201 to 204. The number of panels to which a single glass substrate is allocated is not limited to four, but may be set as desired.

SUMMARY OF THE INVENTION

The layout as shown in FIG. 2 can provide an advantage that the manufacturing cost of the active matrix liquid crystal display device can be reduced. However, it has been found that if panels are actually produced with the layout as shown in FIG. 2, failures likely occur with a particular tendency.

For example, if the single glass substrate 101 is allocated to the four panels 201 to 204 in the manner shown in FIG. 2, failures occur at a high probability in the panels 201, 203 and 204. The reason is explained as follows. It has been found that where the active matrix liquid crystal display panel of FIG. 1 is produced singly, more than 80% of circuit failures occur in the peripheral driving circuit area 103. Further, observations with an optical microscope have revealed that failures are caused mainly by particles.

The fact that failures occur in the peripheral driving circuit area 103 at a high probability attributes to two concurrent factors. First, the peripheral driving circuit area 103 has a much higher degree of integration than the pixel area 102. The second factor is as follows. In general, as exemplified in FIG. 9, a thin-film transistor manufacturing process includes many steps. For example, when a substrate is moved in a transition from one step to the next, minute particles fall on the substrate more likely in a region closer to the perimeter of the substrate.

Since the peripheral driving circuit area 103 has a higher decree of integration than the pixel area 102 as described above, a failure is caused by particles at a higher probability in the peripheral driving circuit area 103. On the other hand, where semiconductor devices are formed on a single substrate, particles (dust) are distributed on the substrate in each step (in general, semiconductor devices are formed through many steps) at a higher percentage in a region closer to the perimeter of the substrate. Therefore, when a panel is produced as shown in FIG. 1, a failure occurs at a higher probability in the peripheral driving circuit area 103. Once a failure occurs in the peripheral driving circuit area 103, no signal current flows through a gate line or a source line that is connected to a location of failure, resulting in a line defect. Even if the failure does not cause a line defect, it will cause a flicker on the screen or an unclear display.

Now, where the respective cells are produced with the layout of FIG. 2, it is seen that the peripheral driving circuit areas 205, 207 and 208, which themselves are prone to a failure due to particles, exist in regions close to the perimeter of the glass substrate 101 in which regions particles occur at a high probability. Thus, it is understood that failures occur at a high probability in the peripheral driving circuit areas 205, 207 and 208.

Based on the recognition of the foregoing problem, an object of the present invention is to provide a technique of suppressing failures in a case where a plurality of panels are produced from one substrate as shown in FIG. 2.

According to one aspect of the invention, there is provided a method for manufacturing a panel that constitutes a liquid crystal display device in which a pixel area and a peripheral driving circuit area are formed in an integral manner on a substrate having a insulating surface, wherein layout is so made that a distance between the perimeter of the substrate and the peripheral driving circuit area is longer than a distance between the perimeter of the substrate and the pixel area.

In the above method, usually a glass substrate is employed as the substrate having an insulating surface. Alternatively, a quartz substrate or a resin substrate may also be used.

The pixel area has a number of pixels that are arranged in a matrix form. Each pixel has at least one switching thin-film transistor and, if necessary, a holding capacitor. The peripheral driving circuit area includes circuits for driving the thin-film transistors in the pixel area. The peripheral driving circuit may includes thin film transistors formed on the same substrate as the switching transistors.

FIG. 7 shows a specific example of the feature "layout is so made that a distance between the perimeter of the substrate and the peripheral driving circuit area is longer than a distance between the perimeter of the substrate and the pixel area." The example of FIG. 7 is directed to a case of producing four panels from a glass substrate 101. In this case, distances a and b between the perimeter of the glass substrate 101 and a peripheral driving circuit area 701 are set larger than distances a' and b'. A similar layout may be used for a case where the number of panels produced from a single substrate is larger than four. In accordance with a preferred embodiment of the invention, when the substrate 101 is 127mm×127mm, the distance a' and b' from the periphery of the substrate 101 to the pixel areas should be at least 10 mm so that the minimum quality of the thin films can be guaranteed. Also, the distance a and b from the periphery of the substrate 101 to the peripheral circuit region should be at least 1.5 times larger than the distance a' and b'. Also, the distance c and c' is preferably 5 mm or smaller.

According to another aspect of the invention, there is provided a method for simultaneously manufacturing four panels that constitute respective liquid crystal display devices in each of which a pixel area and a peripheral driving circuit area are formed in an integral manner on a single substrate having a insulating surface, wherein layout is so made that the peripheral driving circuit areas of the respective panels are opposed to each other.

FIG. 3 shows a specific example of the above method, i.e., a layout for producing four panels from one glass substrate 101. In FIG. 3, layout is so made that peripheral driving circuit areas 305 to 308 are opposed to each other.

Where a and b are set larger than a' and b' as shown in FIG. 7, the rate of occurrence of failures in the peripheral driving circuit areas 701 to 703, which have a high degree of integration and are as much prone to be affected by particles, can be reduced. In addition, it becomes possible to use the substrate 101 more efficiently.

Where layout is so made that the peripheral driving circuit areas 305 to 308 are opposed to each other as shown in FIG. 3 in producing four panels from one substrate 101, occurrence of failures in the peripheral driving circuit areas 305 to 308 can be suppressed.

DETAILED DESCRIPTION OF THE PREFERRED EMBODIMENTS

Embodiment 1

Figure 3:
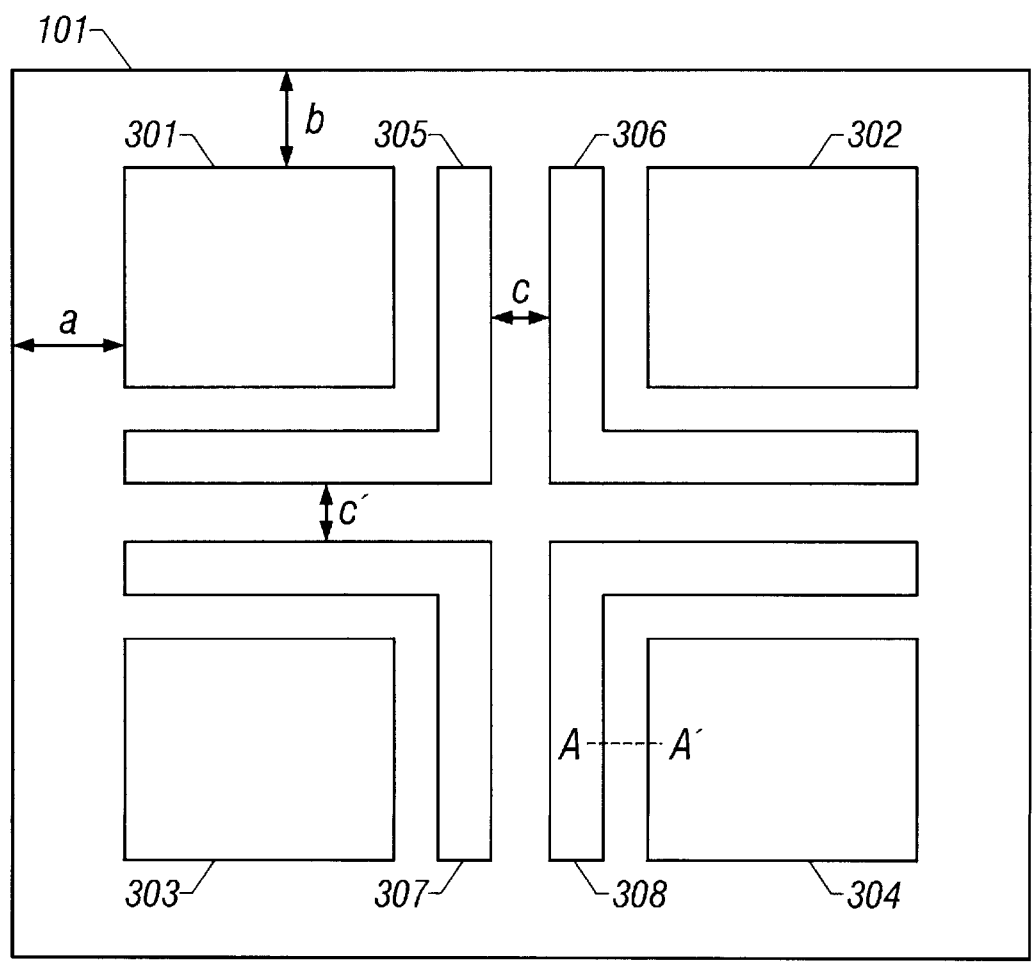
FIG. 3 shows layout of panels that constitute respective active matrix display devices according to a first embodiment of the present invention.

FIG. 3 shows a layout of substrates which constitutes an active matrix liquid crystal display device according to this embodiment. This embodiment is directed to a case of allocating one glass substrate 101 to four panels. In FIG. 3, reference numerals 305 to 308 denote peripheral driving circuit areas and 301 to 304 denote pixel areas.

Figure 1:
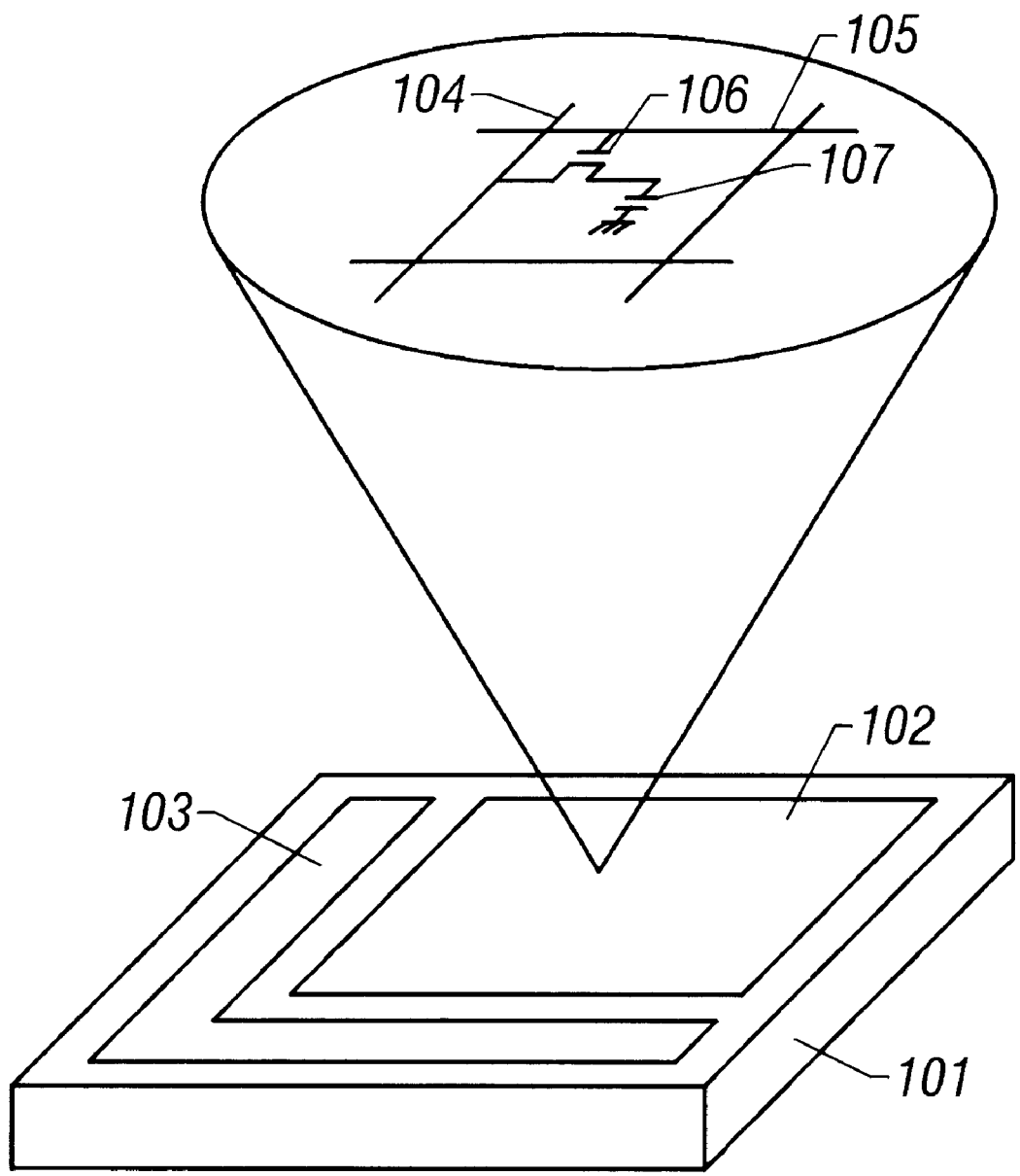
FIG. 1 shows a general configuration of a panel of an active matrix liquid crystal display device incorporating peripheral driving circuits.
Figure 2:
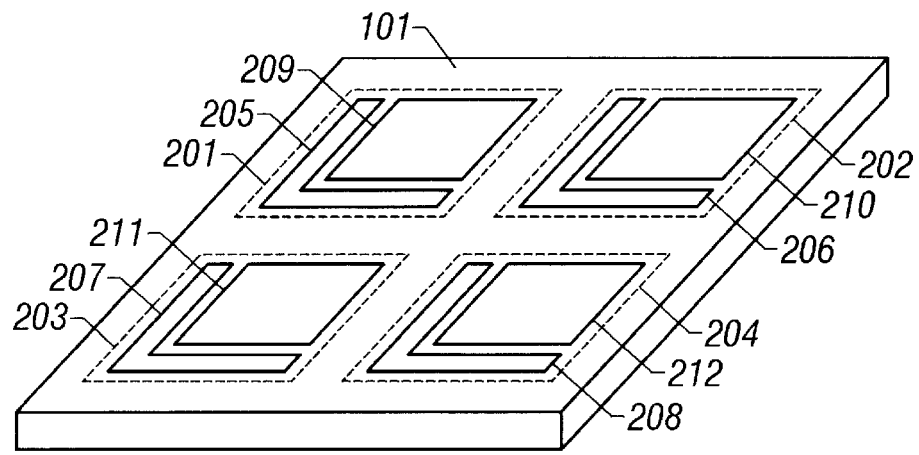
FIG. 2 shows a conventional layout of panels that constitute active matrix liquid crystal display devices.

With the layout of FIG. 3, most part of the peripheral driving circuit areas 305 to 308, which are prone to a failure due to the existence of particles, can be located in regions of the substrate 101 where particles exist at a relatively low probability. Therefore, the occurrence of failures due to the existence of particles can be suppressed from the case of the layout as shown in FIG. 2.

In the configuration of FIG. 3, distances a and b can be set equal to each other. To efficiently using the substrate 101, it is preferred that the distances a and b be set as short as possible within a range of not reducing the yield. Since the pixel areas 301 to 304 are less likely affected by particles than the peripheral driving circuit areas 305 to 308, the distances a and b can be set relatively short. A distance c can be set shorter than the distances a and b.

It should be noted that where panels produced with the layout of FIG. 3 include two pairs of panels having an opposite positional relationship between the peripheral driving circuit area and the pixel area.

Figure 9:
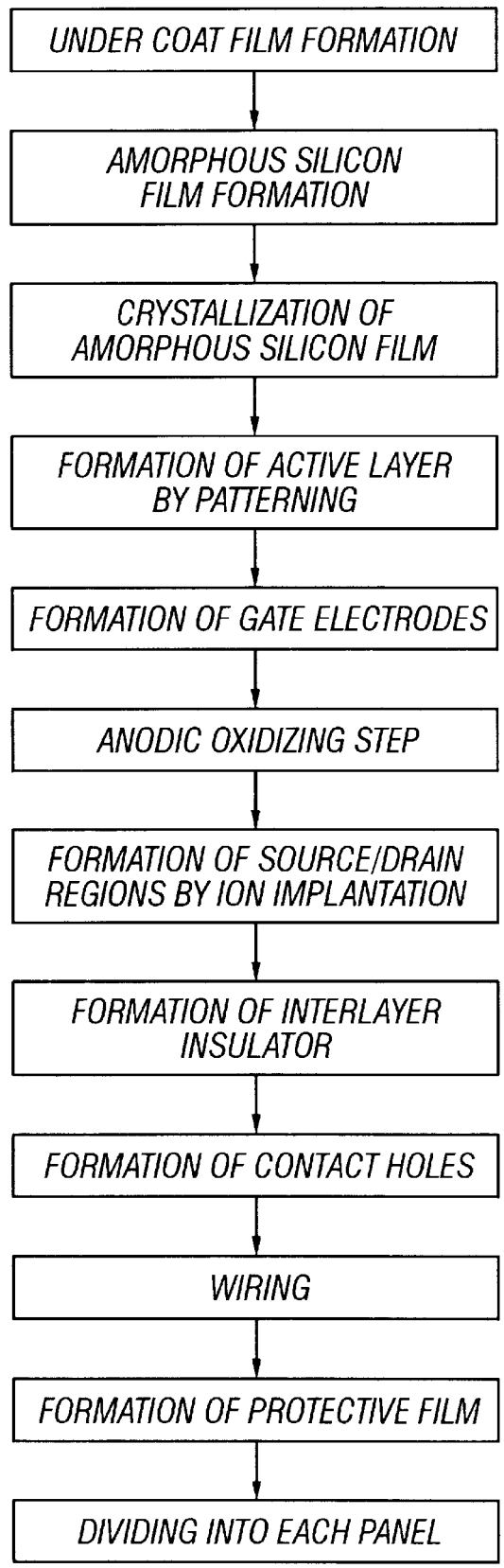
FIG. 9 is a flow chart generally showing the manufacturing process of FIGS. 4A to 4D and FIGS. 5A to 5C.

FIGS. 4A to 4D and FIGS. 5A to 5C show a manufacturing process of a panel in which a peripheral driving circuit area and a pixel area are formed on the same substrate, i.e., a panel incorporating peripheral driving circuits. FIG. 9 is a flow chart generally showing the same process.

More specifically, FIGS. 4A to 4D and FIGS. 5A to 5C shows a process of simultaneously forming a thin-film transistor CMOS circuit that constitutes a peripheral driving circuit area and N-channel thin-film transistors in a pixel area. Each of FIGS. 4A to 4D and FIGS. 5A to 5C is part of a cross-section taken along line A–A' in FIG. 3.

First, a silicon oxide film 402 as an undercoat film is deposited on the surface of a glass substrate 401 by sputtering at a thickness of 3,000 Å, for instance. An amorphous silicon film 403 is deposited thereon by plasma CVD or low-pressure thermal CVD at a thickness of 500 Å, for instance. The amorphous silicon film 403 is crystallized by illuminating it with laser light. This results in a structure shown in FIG. 4A. Alternatively, the amorphous silicon film 403 may be crystallized by heating, or a combination of heating and laser light illumination.

By patterning the crystallized silicon film, active layers 404 and 405 to constitute a CMOS circuit of the peripheral driving circuits and an active layer 406 to constitute an N-channel thin-film transistor in the pixel area are obtained. This results in a structure shown in FIG. 4B.

Thereafter, a silicon oxide film 407 to serve as a gate insulating film is deposited by sputtering at a thickness of 1,000 Å, for instance. A film mainly made of aluminum and containing a very small amount of scandium is formed thereon by sputtering or electron beam evaporation at a thickness of 6,000 Å, for instance. By patterning the film just formed, gate electrodes 408 to 410 are formed.

Subsequently, the substrate is subjected to anodic oxidation in an electrolyte in which the gate electrodes 408 to 410 are used as anodes, to form oxide layers 411 to 413 having a thickness of 2,000 Å, for instance. This results in a structure shown in FIG. 4C. The oxide layers 411 to 413 will become a mask in a subsequent impurity ion implanting step, that is, will serve to form offset gate regions.

Figure 4A:
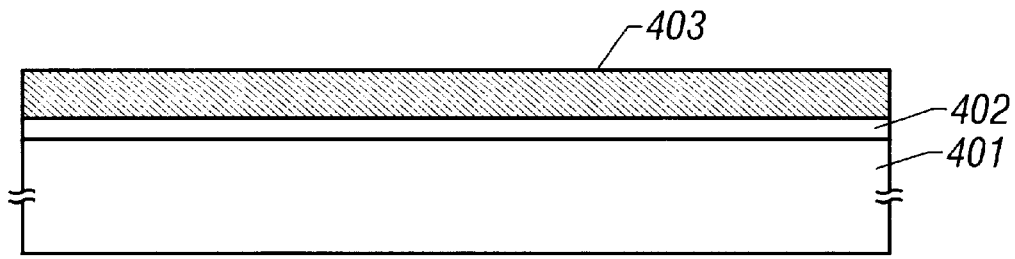
FIGS. 4A to 4D and FIGS. 5A to 5C are sectional views showing a manufacturing process of a panel that constitutes an active matrix liquid crystal display device according to the first embodiment.
Figure 4B:
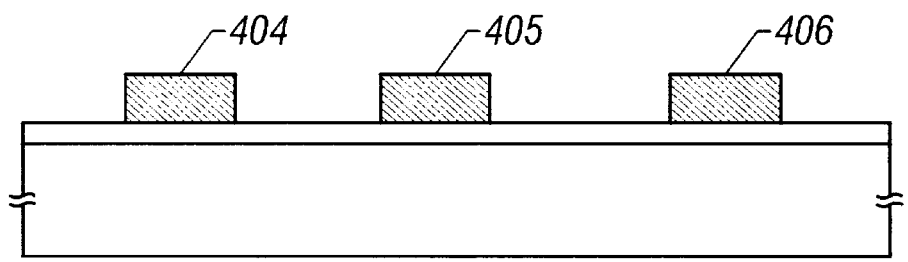
Figure 4C:
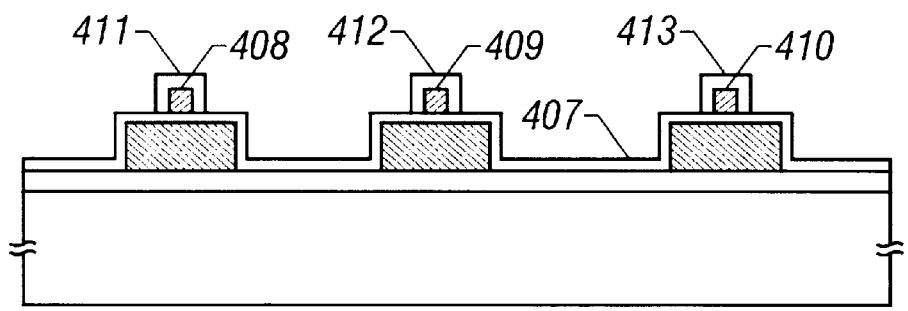
Figure 4D:
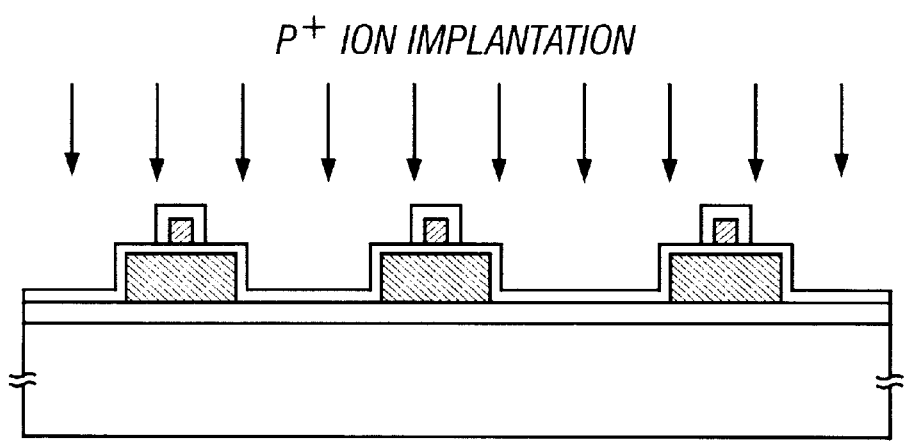

Thereafter, P+ ions (phosphorus ions) are accelerated and implanted into the active layers 404 to 406 by ion doping or plasma doping. (FIG. 4D)

Figure 5A:
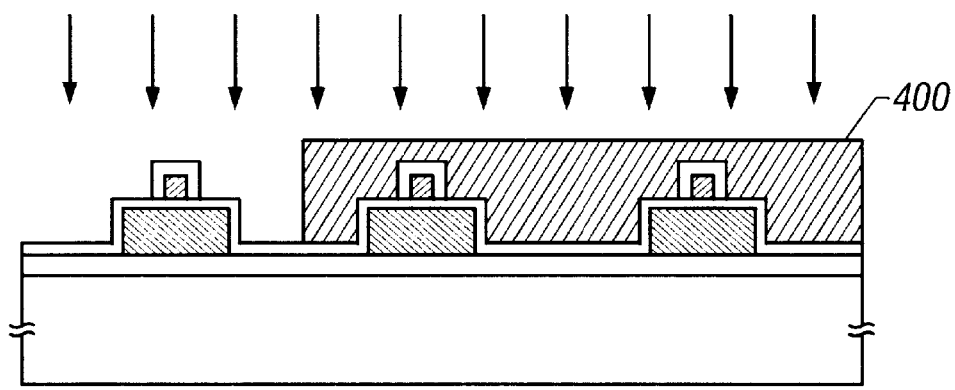

After a prescribed area is covered with a resist mask 400, B+ ions (boron ions) are accelerated and implanted by plasma doping or ion doping. (FIG. 5A)

Figure 5B:
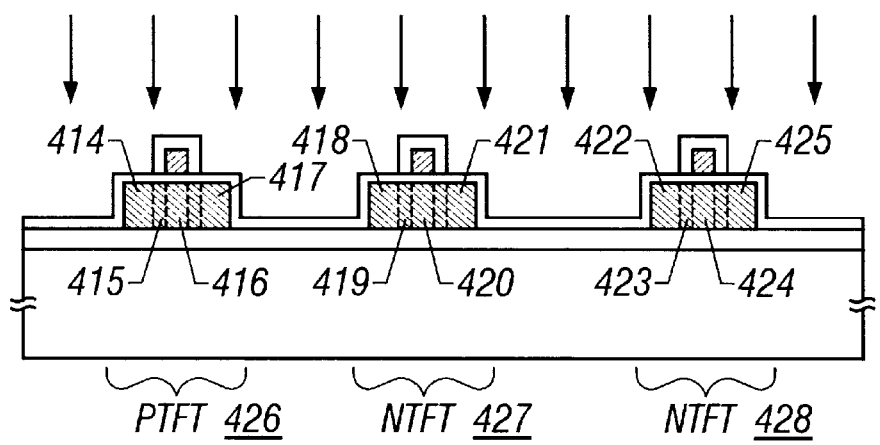

After the resist mask 400 is removed, laser light is applied to re-crystallize the regions where impurity ions have been implanted and to activate the introduced impurity ions. (FIG. 5B)

Thus, a source region 414, a channel forming region 416, a drain region 417, and offset gate regions 415 of a P-channel thin-film transistor (PTFT) 426, and a drain region 418, a channel forming region 420, a source region 421, and offset gate regions 419 of an N-channel thin-film transistor (NTFT) 427 are formed. The P-channel thin-film transistor 426 and the N-channel thin-film transistor 427 constitute a CMOS circuit, which is part of peripheral driving circuits.

Further, a source region 422, a channel forming region 424, a drain region 425, and offset gate regions 423 of an N-channel thin-film transistor (NTFT) 428 are formed at the same time as the above TFTs 426 and 427.

Figure 5C:
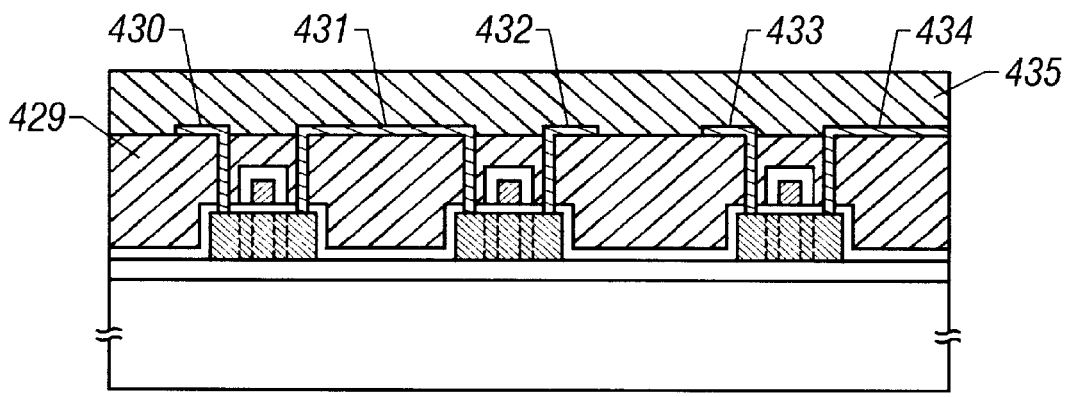

Subsequently, a silicon oxide film as an interlayer insulating film 429 is deposited by plasma CVD at a thickness of 7,000 Å, for instance. After contact holes are formed, source wiring lines 430, 432 and 433, and a drain wiring line 431 are formed with aluminum or some other appropriate metal material. The drain wiring line 431 is common to the PTFT 426 and the NTFT 427, which constitute the CMOS circuit. Further, an ITO electrode 434 is so formed as to extend to a pixel electrode. A protection film 435 is then formed. Thus, as shown in FIG. 5C, the peripheral driving circuit area and the pixel area are simultaneously formed on the glass substrate 401.

Thereafter, the respective panels are cut out to produce individual panels. Thus, the panels to constitute active matrix liquid crystal display devices can be obtained.

Embodiment 2

Figure 6:
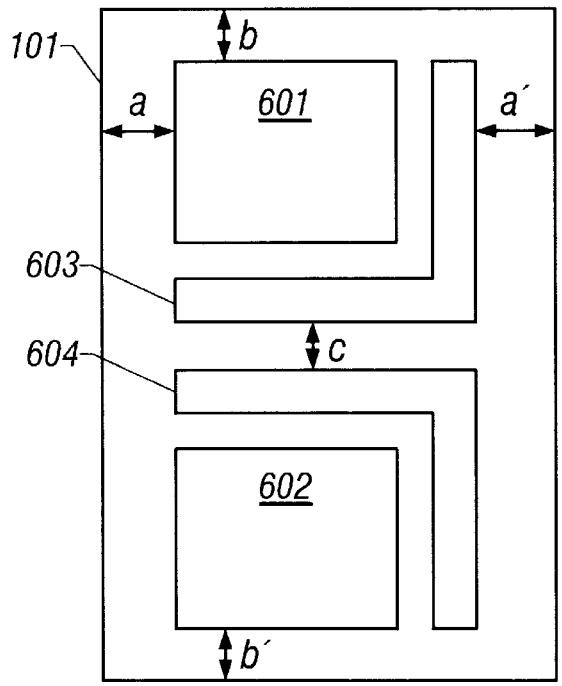
FIG. 6 shows a layout of panels that constitute respective active matrix display devices according to a second embodiment of the invention.

This embodiment is directed to a case of producing two panels from one glass substrate. FIG. 6 shows a general layout of this embodiment. In FIG. 6, reference numerals 603 and 604 denote peripheral driving circuit areas and numerals 601 and 602 represent pixel areas. With the configuration of FIG. 6, the yield of the panel formation can be increased by making a' longer than a. That is, by making the dimension a' long which considerably affects the rate of occurrence of failures, the reduction of the utilization ratio of a substrate 101 can be minimized as well as the yield can be made high. As for dimensions a, b and b', a relationship b≈b'≈a may be established in terms of minimum necessary values. Distance c can be set smaller than a, a', b and b'. That is, a relationship a, a', b, b'>c can be established.

While the relationships among a, a', b, b' and c are given as described above, specific values of these parameters depend on a necessary yield, conditions of device manufacturing process, and the cleanliness of the process and need to be determined experimentally.

Embodiment 3

Figure 7:
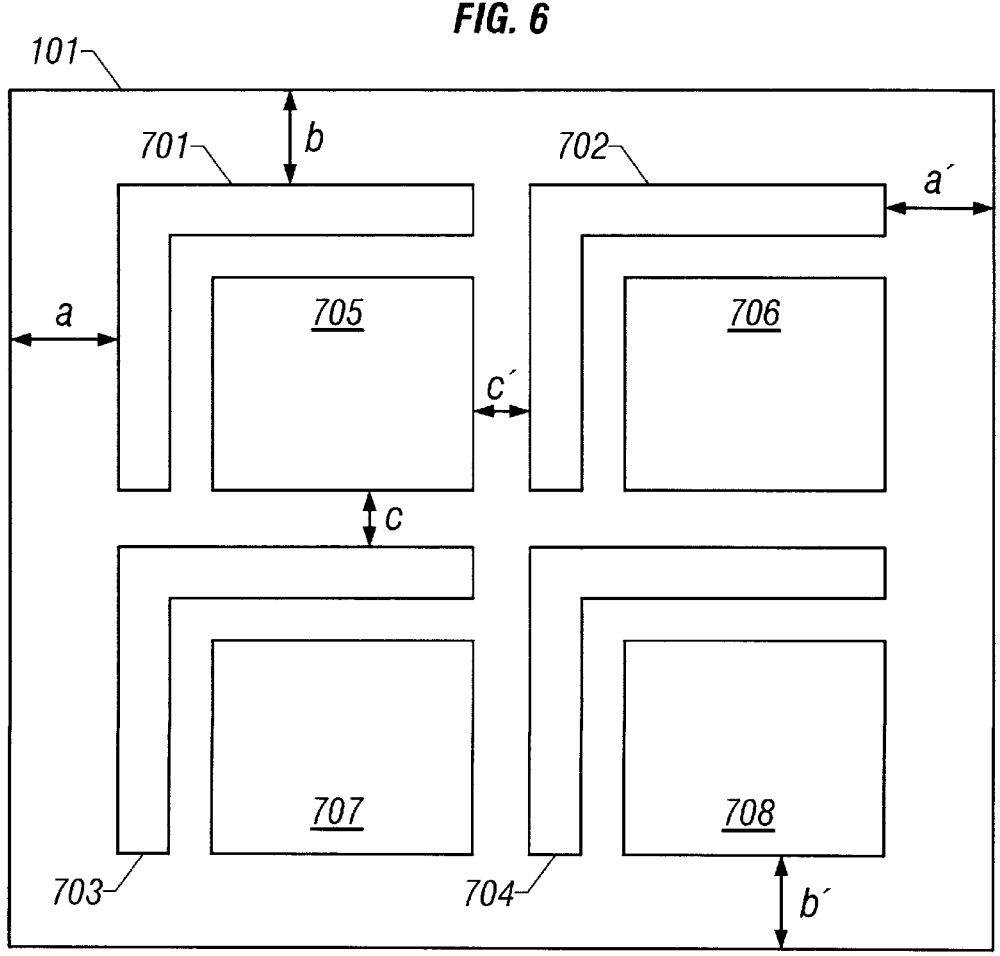
FIG. 7 shows a layout of panels that constitute respective active matrix display devices according to a third embodiment of the invention.

This embodiment is directed to a case of producing four panels from one glass substrate 101 with a layout shown in FIG. 7. In FIG. 7, reference numerals 701 to 704 denote peripheral driving circuit areas and numerals 705 to 708 represent pixel areas. With the layout of FIG. 7, the rate of occurrence of failures due to particles that fall on the peripheral driving circuit areas 701 to 704 call be suppressed by establishing a relationship a'<a and b'<b. At the same time, by making a' and b' short, panels can be produced with efficient use of the glass substrate 101. Relationships a≈b and a'≈b' may be established. Distances c and c' can be set shorter than a, a', b and b', that is, can be selected within such ranges as to satisfy a relationship c, c'<a, a', b, b'. Further, a relationship c=c' may be established.

With the layout of FIG. 7, the positional relationship between the peripheral driving circuit area and the pixel area can be made identical in any of the panels. Therefore, this layout is advantageous over the layout of FIG. 3 in being capable of producing panels having the same configuration.

Embodiment 4

Figure 8:
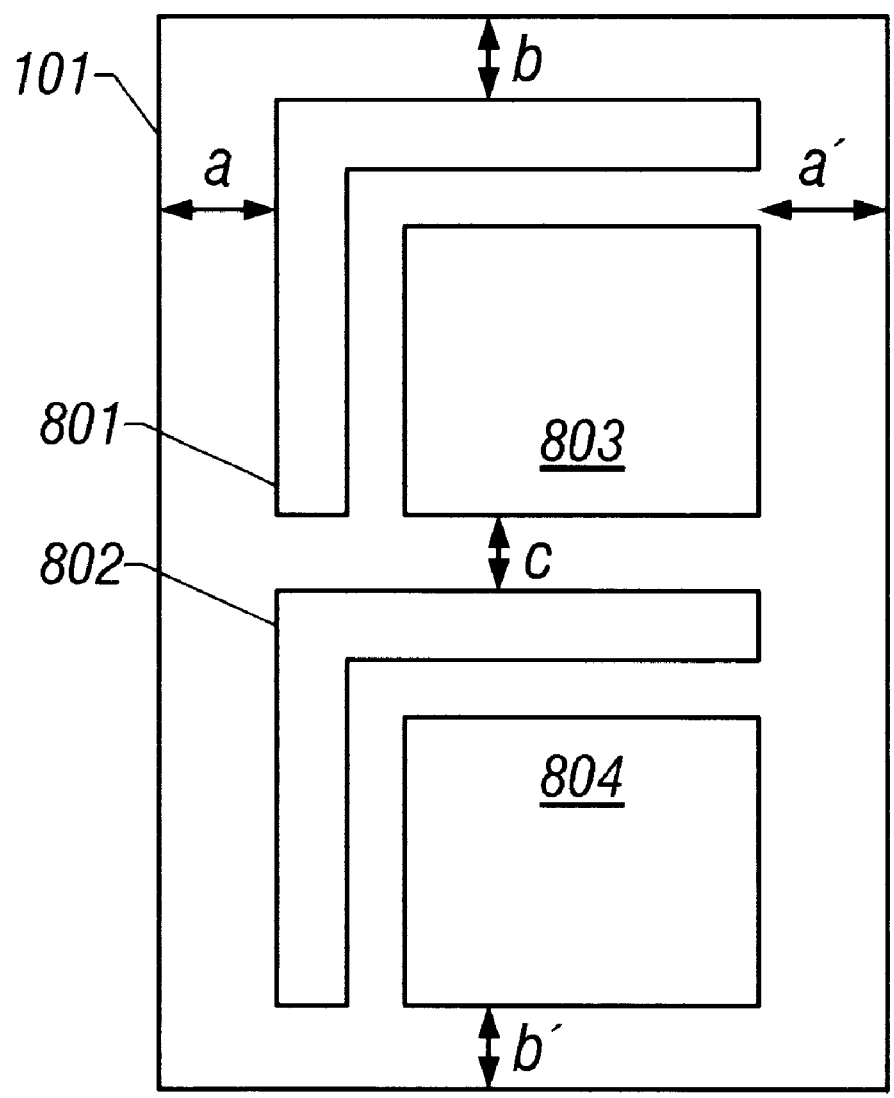
FIG. 8 shows a layout of panels that constitute respective active matrix display devices according to a fourth embodiment of the invention.

This embodiment is directed to a case of producing two panels with a layout shown in FIG. 8. In FIG. 8, reference numerals 801 and 802 denote peripheral driving circuit areas and numerals 803 and 804 represent pixel areas.

With the layout of FIG. 8, the rate of occurrence of failures in the peripheral driving circuit areas 801 and 802 can be suppressed by establishing relationships a>a' and b>b', as well as a glass substrate 101 can be used efficiently. A relationship a=b may be established as long as there is no particular problem. Similarly, a relationship a'=b' may be established as long as there is no particular problem. Distance c can be so set as to satisfy a condition a, a', b, b'>c.

As described above, in the manufacture of the active matrix liquid crystal display device, the invention can improve the yield while efficiently using glass substrates.

What is claimed is:

1. A method for simultaneously manufacturing four panels that constitute respective liquid crystal display devices in each of which both a pixel area and a peripheral driving circuit area are formed in an integral manner on the same substrate having an insulating surface, wherein layout is so made that the peripheral driving circuit areas of the respective panels are opposed to each other and the pixel areas of the respective panels face a perimeter of the substrate.

2. The method according to claim 1, wherein a distance between the peripheral driving circuit areas is 5 mm or less.

3. A method for manufacturing a panel that constitutes a liquid crystal display device in which both a pixel area and a peripheral driving circuit area are formed in an integral manner in the same substrate having an insulating surface, wherein layout is so made that a distance between one side of a perimeter of the substrate and the peripheral driving circuit area is longer than a distance between another side of the perimeter of the substrate and the pixel area, and wherein most of said one side of the perimeter of the substrate is adjacent to said peripheral driving circuit area and most of said another side of the perimeter of the substrate is adjacent to said pixel area, wherein said distance between said another side of the perimeter of the substrate and said pixel area is at least 10 mm when the substrate is about 127mm×127mm.

4. A method for simultaneously manufacturing a plurality of panels that constitute respective liquid crystal display devices in each of which both a pixel area and a peripheral driving circuit area are formed in an integral manner on the same substrate having an insulating surface, wherein layout is so made that a distance between one side of a perimeter of the substrate and the peripheral driving circuit area is longer than a distance between another side of the perimeter of the substrate and the pixel area, and wherein most of said one side of the perimeter of the substrate is adjacent to said peripheral driving circuit area and most of said another side of the perimeter of the substrate is adjacent to said pixel area, wherein said distance between said another side of the perimeter of the substrate and said pixel area is at least 10 mm when the substrate is about 127mm×127mm.

5. A method for manufacturing a panel that constitutes a liquid crystal display device in which both a pixel area and a peripheral driving circuit area are formed in an integral manner in the same substrate having an insulating surface, wherein layout is so made that a distance between one side of a perimeter of the substrate and the peripheral driving circuit area is longer than a distance between another side of the perimeter of the substrate and the pixel area, and wherein most of said one side of the perimeter of the substrate is adjacent to said peripheral driving circuit area and most of said another side of the perimeter of the substrate is adjacent to said pixel area, wherein said distance between said one side of the perimeter of the substrate and said peripheral driving circuit areas is at least about 1.5 times greater than said distance between said another side of the perimeter of the substrate and the pixel area.

6. A method for simultaneously manufacturing a plurality of panels that constitute respective liquid crystal display devices in each of which both a pixel area and a peripheral driving circuit area are formed in an integral manner on the same substrate having an insulating surface, wherein layout is so made that a distance between one side of a perimeter of the substrate and the peripheral driving circuit area is longer than a distance between another side of the perimeter of the substrate and the pixel area, and wherein most of said one side of the perimeter of the substrate is adjacent to said peripheral driving circuit area and most of said another side of the perimeter of the substrate is adjacent to said pixel area, wherein said distance between said one side of the perimeter of the substrate and said peripheral driving circuit areas is at least about 1.5 times greater than said distance between said another side of the perimeter of the substrate and the pixel area.

* * * * *